United States Patent
Martinschledde et al.

(10) Patent No.: US 11,705,790 B2
(45) Date of Patent: Jul. 18, 2023

(54) METHOD FOR PRODUCING AN ARRANGEMENT FOR A PLUG-IN COIL OF AN ELECTRICAL MACHINE, AND ARRANGEMENT

(71) Applicant: AUMANN AG, Beelen (DE)

(72) Inventors: Ludger Martinschledde, Rietberg (DE); Florian Sell-Le Blanc, Karlsruhe (DE); Timo Schmit, Ostenfelde (DE)

(73) Assignee: Aumann AG, Beelen (DE)

( * ) Notice: Subject to any disclaimer, the term of this patent is extended or adjusted under 35 U.S.C. 154(b) by 233 days.

(21) Appl. No.: 16/770,413

(22) PCT Filed: Dec. 6, 2018

(86) PCT No.: PCT/DE2018/100995
§ 371 (c)(1),
(2) Date: Jun. 5, 2020

(87) PCT Pub. No.: WO2019/110057
PCT Pub. Date: Jun. 13, 2019

(65) Prior Publication Data
US 2020/0295635 A1 Sep. 17, 2020

(30) Foreign Application Priority Data
Dec. 7, 2017 (DE) ...................... 10 2017 129 134.2

(51) Int. Cl.
*H02K 15/00* (2006.01)
*H02K 3/28* (2006.01)
*H02K 3/50* (2006.01)

(52) U.S. Cl.
CPC ........... *H02K 15/0081* (2013.01); *H02K 3/28* (2013.01); *H02K 3/50* (2013.01)

(58) Field of Classification Search
CPC ............ H02K 3/12; H02K 3/28; H02K 3/505; H02K 15/0056–0081; H02K 2203/09
(Continued)

(56) References Cited

U.S. PATENT DOCUMENTS 6,252,327 B1 * 6/2001 Matsuzaki ............... H02K 3/12
310/201
2003/0127935 A1 7/2003 Mori et al.
(Continued)

FOREIGN PATENT DOCUMENTS

CN 105720722 A 6/2016
DE 600 30 073 T2 3/2007
(Continued)

OTHER PUBLICATIONS

International Search Report (in English and German) and Written Opinion of the International Searching Authoriy (in German) issued in PCT/DE2018/100995; dated Feb. 5, 2019; ISA/EP.

*Primary Examiner* — Ahmed Elnakib
*Assistant Examiner* — Minki Chang
(74) *Attorney, Agent, or Firm* — Harness, Dickey & Pierce, P.L.C.

(57) ABSTRACT

The invention relates to a method for producing an arrangement for a plug-in coil of an electrical machine, comprising the steps of: providing a core with slots; providing coil elements which are rod-shaped and have a proximal end and a distal end; inserting the coil elements into the slots from an end side of the core with the distal end at the front in such a way that the proximal end is arranged in the region of the end side and the distal end is arranged in the region of an opposite end side of the core or adjacent to it; and producing a respective jointed connection for the distal ends or the proximal ends of a first coil element and of a second coil element with an associated first connecting element on the opposite end side or the end side of the core, wherein, here, before joining between the respective joining partners, specifically the distal end or the proximal end of the first coil element and a first joining section of the first connecting element and also the distal end or the proximal end of the second coil element and a second joining section of the first (Continued)

connecting element, a connection is formed in each case, with which the relative position of the joining partners in relation to one another is defined. The invention further provides an arrangement for a plug-in coil of an electrical machine.

13 Claims, 7 Drawing Sheets

(58) Field of Classification Search
USPC .................................................. 310/179–213
See application file for complete search history.

(56) References Cited

U.S. PATENT DOCUMENTS

| | | | | |
|---|---|---|---|---|
| 2010/0301685 | A1* | 12/2010 | Grundl | H02K 3/12 |
| | | | | 310/12.21 |
| 2013/0020890 | A1* | 1/2013 | Iki | H02K 9/227 |
| | | | | 310/71 |
| 2013/0200743 | A1* | 8/2013 | Okimitsu | H02K 3/12 |
| | | | | 310/201 |
| 2016/0181881 | A1 | 6/2016 | Magri et al. | |
| 2019/0140505 | A1* | 5/2019 | Röer | H02K 15/085 |

FOREIGN PATENT DOCUMENTS

| | | | |
|---|---|---|---|
| DE | 10 2007 021 737 A1 | 11/2008 | |
| DE | 10 2009 001 846 A1 | 9/2010 | |
| DE | 10 2009 001 850 A1 | 9/2010 | |
| DE | 10 2011 016 115 A1 | 11/2011 | |
| DE | 10 2012 206 627 A1 | 10/2012 | |
| DE | 10 2016 205 633 A1 | 10/2017 | |
| EP | 1039616 A2 * | 9/2000 | ............... H02K 3/12 |
| EP | 3 082 228 A1 | 10/2016 | |
| GB | 2 358 523 A | 7/2001 | |
| WO | WO-2015/055445 A2 | 4/2015 | |
| WO | WO-2017186644 A1 | 11/2017 | |

* cited by examiner

METHOD FOR PRODUCING AN ARRANGEMENT FOR A PLUG-IN COIL OF AN ELECTRICAL MACHINE, AND ARRANGEMENT

CROSS REFERENCE TO RELATED APPLICATIONS

This application is a U.S. National Phase Application under 35 U.S.C. 371 of International Application No. PCT/DE2018/100995 filed on Dec. 6, 2018, which claims the benefit of priority from German Patent Application No. 10 2017 129 134.2 filed Dec. 7, 2017. The entire disclosures of all of the above applications are incorporated herein by reference.

The invention relates to a method for producing an arrangement for a plug-in coil of an electrical machine and an arrangement for a plug-in coil of an electrical machine.

BACKGROUND

Such a method is known, for example, from the document WO 2015/055445 A2. An arrangement for a plug-in coil of an electrical or electrodynamic machine is produced for a stator or a rotor. In doing so, rod-shaped or hairpin-shaped coil elements are first pre-aligned or pre-positioned in order to provide a basket-like, self-contained arrangement of the coil elements. Legs of the coil elements of the pre-aligned arrangement are then inserted into associated grooves in a core in order to finally produce a coil winding.

In the document EP 3 082 228 A1, in conjunction with a plug-in coil, a method is described in which connecting elements are arranged on an end face of the core for connecting ends of coil elements. These are secured there with the aid of securing elements having projecting parts which overlap the connecting elements in order to fix said connecting elements in their position.

SUMMARY

The object of the invention is to provide improved technologies in conjunction with the production of an arrangement for a plug-in coil of an electrical machine, be it in conjunction with a rotor or a stator, which technologies assist flexible production of the plug-in coil.

To achieve the object, a method for producing an arrangement for a plug-in coil of an electrical machine according to the independent claim 1 is provided. The additional independent claim 15 relates to an arrangement for a plug-in coil of an electrical machine. Embodiments are the subject matter of dependent claims.

According to one aspect, a method for producing an arrangement for a plug-in coil of an electrical machine is provided, in which arrangement a core having grooves and coil elements are provided, which coil elements are rod-shaped and have a proximal end and a distal end. In the method, the coil elements are inserted into the grooves from one end of the core with the distal end at the front, in such a way that the proximal end is arranged in the region of the end face and the distal end is arranged in the region of an opposite end face of the core or adjacent to it. A particular joined connection is produced for the distal end or the proximal end of a first coil element and of a second coil element by means of an associated first connecting element on the opposite end face or the end face of the core a connection being formed in each case, before the joining process, between the respective joining partners, specifically the distal end or the proximal end of the first coil element and a first joining portion of the first connecting element and the distal end or the proximal end of the second coil element and a second joining portion of the first connecting element, by means of which connection the relative position of the joining partners in relation to one another is fixed.

According to a further aspect, an arrangement for a plug-in coil of an electrical machine is provided. The arrangement has a core having grooves and coil elements, which coil elements are rod-shaped and have a proximal end and a distal end. The coil elements are inserted into the grooves from one end face of the core, in such a way that the proximal end is arranged in the region of the end face and the distal end is arranged in the region of an opposite end face or adjacent to it. For pre-positioning before a joining process, a connection is formed in each case between respective joining partners, specifically the distal end or the proximal end of a first coil element and a first joining portion of a first connecting element and the distal end or the proximal end of a second coil element and a second joining portion of the first connecting element, by means of which connection the relative position of the joining partners in relation to one another is fixed.

The proposed technologies allow formation of the electrical connections between the inserted coil elements in the grooves of the core in a manner which is flexible and adapted to different applications.

Before the joining partners are joined, additional pre-positioning and/or securing measures can optionally be provided in order to (finally) fix the joining partners for joining. Alternatively, the joining partners can be joined without further measures for pre-positioning, in such a way that, for the joining process, the joining partners are positioned relative to one another exclusively on the basis of the connection produced.

The relative position of the joining partners can be fixed or secured with regard to the spatial position of the joining partners by means of the connection produced.

The joining partners can be releasably connected to one another by means of the connection.

The coil elements can have various forms of the rod-shaped design. This also includes, for example, a hairpin shape or a U shape, in which shapes rod-shaped legs are connected to one another on one side, in such a way that the joined connections can be produced in the region of free ends of the coil elements after the coil elements have been inserted into the core.

The inserted coil elements are electrically insulated from the material of the core in the grooves of the core. For this purpose, it can be provided, for example, that an insulating jacket is provided which surrounds the coil elements in the associated groove. Various designs are known per se for forming the electrical insulation.

The connection can be carried out as at least one connection from the following group: snap connection, plug-in connection, detent connection and embossed connection.

In the region of the connection, electrical contact points can be formed between the joining partners on the end face and/or on the circumference. In the region of the electrical contact points, an electrical contact is produced due to the formation of the connection between the partners to be joined (joining partners). During the joining process, the electrical contact between the joining partners can be furthered or supplemented, in particular due to joining material coming into the region between opposite surfaces of the joining partners and thereby electrically contacting the surface.

Surface portions of the joining partners, which portions are provided with a conductor layer, can be brought into contact in the region of the electrical contact points. The conductor layer, for example in the form of a layer made of a metal or a metal alloy, can be applied before the connection is produced between the partners to be joined in order to assist the electrical contact between the joining partners. For example, a layer made of a solder material can be provided, which melts during the joining process to form or improve contact and (additionally) electrically contacts the joining partners (locally).

During formation of the connection between the joining partners, a projection arranged on the distal end or proximal end of the coil element can be arranged in an associated recess on the joining portion of the first connecting element. In one embodiment, in the region of the distal/proximal end of the particular coil element, a projecting pin having a round or angular cross section can be formed which, during production of the connection between the end of the coil element and the associated joining portion of the first connecting element, engages, in particular positively, into an associated recess on the first connecting element, wherein the recess can be configured as an opening or a closed indentation.

A geometrically flat conductor material can be used for the first connecting element. The design of the connecting element or elements as flat conductor material assists, for example, a stacking process of connecting elements, in particular one on top of the other.

At least one intermediate portion of the first connecting element, which is arranged between the first joining portion and the second joining portion, can be arranged at least in portions so as to extend along a radially inner edge and/or a radially outer edge of a surface covered by the core on the opposite end face or the end face. The intermediate portion of the first connecting element can extend substantially completely in the region of the radially inner edge and/or the radially outer edge.

It can be provided that a particular joined connection is produced for the distal or proximal ends of a third coil element and a fourth coil element with an associated second connecting element on the opposite end face or the end face of the core, a connection being formed in each case, before the joining process, in particular for pre-positioning, between the respective joining partners, specifically the distal end or the proximal end of the third coil element and a first joining portion of the second connecting element, and the distal end or the proximal end of the fourth coil element and a second joining portion of the second connecting element, by means of which connection the relative position of the joining partners in relation to one another is defined. In this way, a plurality of connecting elements can be arranged in the region of the opposite end face or the end face of the core for the electrical connection of distal/proximal ends of coil elements. When joining the second connecting element, the distal/proximal end of the first coil element or the second coil element can optionally be included. In this case, alternatively, the joined connection to the distal/proximal end of the third coil element or the fourth coil element can be omitted.

At least the first connecting element can be produced as part of a first segmented switching ring on the opposite end face or the end face of the core. With the aid of the first connecting element and optionally further connecting elements, a first segmented switching ring or connecting ring for the plug-in coil can be produced on the opposite end face or the end face of the core.

Comparable to the joined connections for distal/proximal ends of coil elements on the opposite end face of the core, further joined connections for proximal/distal ends of coil elements can be produced on the end face of the core. For producing the further joined connections at the proximal ends of the coil elements on the end face of the core, further connecting elements are used, which can be designed corresponding to the first connecting element or the second connecting element. The further connecting elements provide joining portions which are joined to the proximal ends of the coil elements. In one embodiment, a second segmented switching or connecting ring for the plug-in coil can be produced on the end face of the core. The second segmented switching or connecting ring can be designed to be the same as the first segmented switching ring or different therefrom.

The coil elements can be provided as straight rod-shaped coil elements. The coil elements inserted into the core can all be of the same design. Alternatively, coil elements of different designs can be inserted, for example coil elements of different lengths and/or having different cross-sectional shapes. In one possible embodiment, U-shaped or hairpin-shaped coil elements can be used, in which elements free ends (on rod-shaped legs) can then be connected by means of the connecting elements.

The coil elements can be inserted into the grooves in sequentially successive insertion processes. In the context of an insertion process, one or more coil elements can be inserted simultaneously and, in the case of a plurality of coil elements, these can be formed separately from one another, i.e. in particular they cannot be interconnected or inserted into one another, which may require the separate coil elements to be gripped separately and to be kept separate during insertion. A subsequent insertion process during the sequential insertion can begin while a previous insertion process has not yet ended. Alternatively, the following insertion process can only be started after the previous insertion process has ended, for example if the same gripping device that was used for the previous insertion process is used for the subsequent insertion process. In another embodiment, several gripping devices can be used, which are used for the insertion operations to be carried out sequentially.

A plurality of connecting elements can be arranged stacked on top of one another in layers on the opposite end face and/or the end face of the core. Stacked arrangements of connecting elements, in which arrangements the layers can be electrically insulated from one another, can be provided on the core on one or both sides. Portions of the stacked arrangement of connecting elements can extend substantially in the region of the radially inner edge and/or the radially outer edge of the surface covered by the core on the end face and/or the opposite end face. Non-stacked portions or free regions can be provided between stacked arrangements in the edge regions.

All or some of the connections between the connecting elements and the ends of the coil elements, which are produced prior to the joining process and which secure the relative position of the joining partners, can be visibly exposed, in particular with respect to the end face and/or the opposite end face of the core. In this way access to or entry for the connection points formed in the connections can be provided, for example in such a way that further processing of the connections for joining is made possible, for example by means of welding, in particular laser welding. Similarly, after the joining, all or some of the joined connections can be visibly exposed, in particular with respect to the end face and/or the opposite end face of the core, which can make it possible, for example, to rework the joined connections.

Alternatively, one or more connections can be covered before and/or after the joining process. In the case of stacked connecting elements, an iterative procedure can be provided here, i.e. first one or more connecting elements are arranged on one level, these are welded, then a next level is formed.

A connecting element which has one or more terminal contacts can be used as the first connecting element. The one or more terminal contacts which are formed, for example, with a tab associated in each case, can protrude radially with respect to the end face/opposite end face of the core. A plurality of terminal contacts, which can be formed on different connecting elements, can be arranged offset relative to one another in the radial circumferential direction. External contacting of a coil formed so as to have the coil elements can take place by means of the terminal contacts.

The connecting element, optionally formed so as to have a terminal contact thereon, can be designed as a stamped component. A design as a flat, optionally planar sheet metal component can be provided.

In the production method and the arrangement, it can be provided that one or more connecting elements are/have been arranged on the end face and/or the opposite end face in a depression or a recess which is formed on the core, for example in a radially outer portion of the core. For example, one or more grooves can be provided. To form the depression/recess, an end-face profile can be provided on the core. One or more connecting elements can be arranged in a depression of the core material.

Cohesive joined connections can be produced during the joining process.

The statements made above in conjunction with the method apply, mutatis mutandis, in conjunction with the arrangement for a plug-in coil of an electrical machine.

DESCRIPTION OF EXEMPLARY EMBODIMENTS

In the following, further embodiments are explained in more detail with reference to figures of the drawings. In the drawings.

Figure 1:
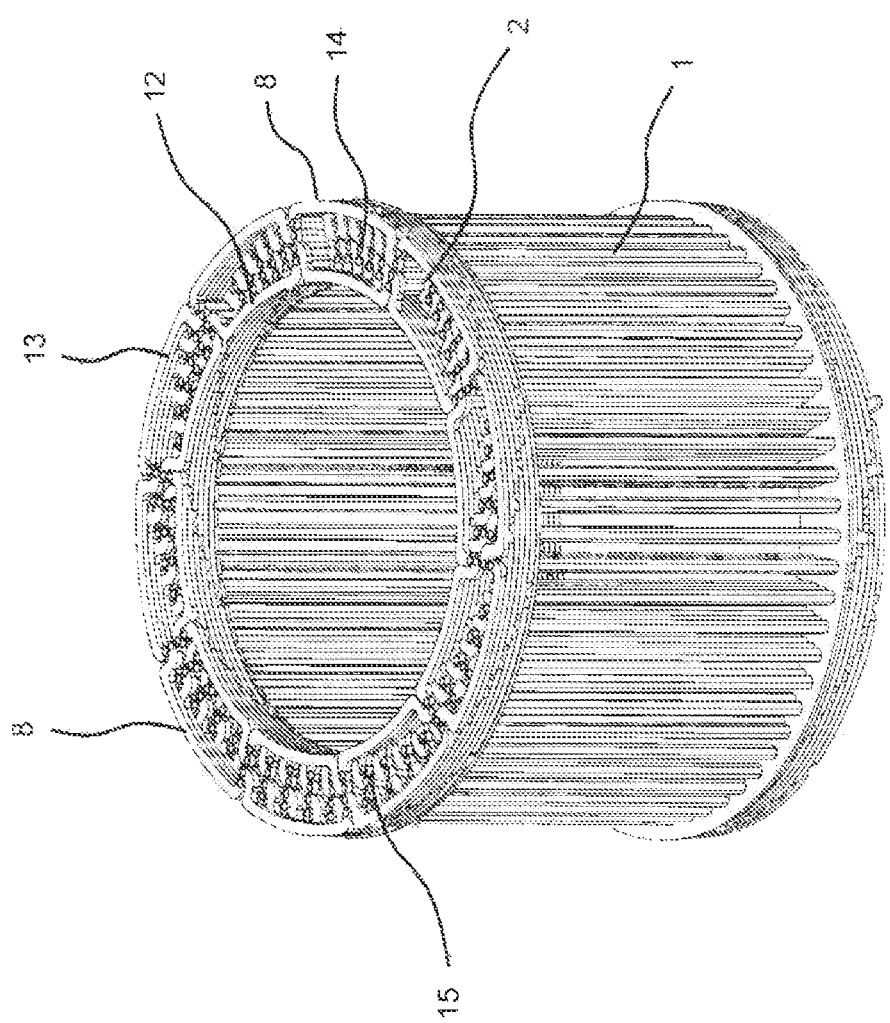
FIG. 1 shows a schematic perspective illustration of an arrangement for a plug-in coil of an electrical machine, wherein a core of the arrangement is omitted for simplification.
Figure 2:
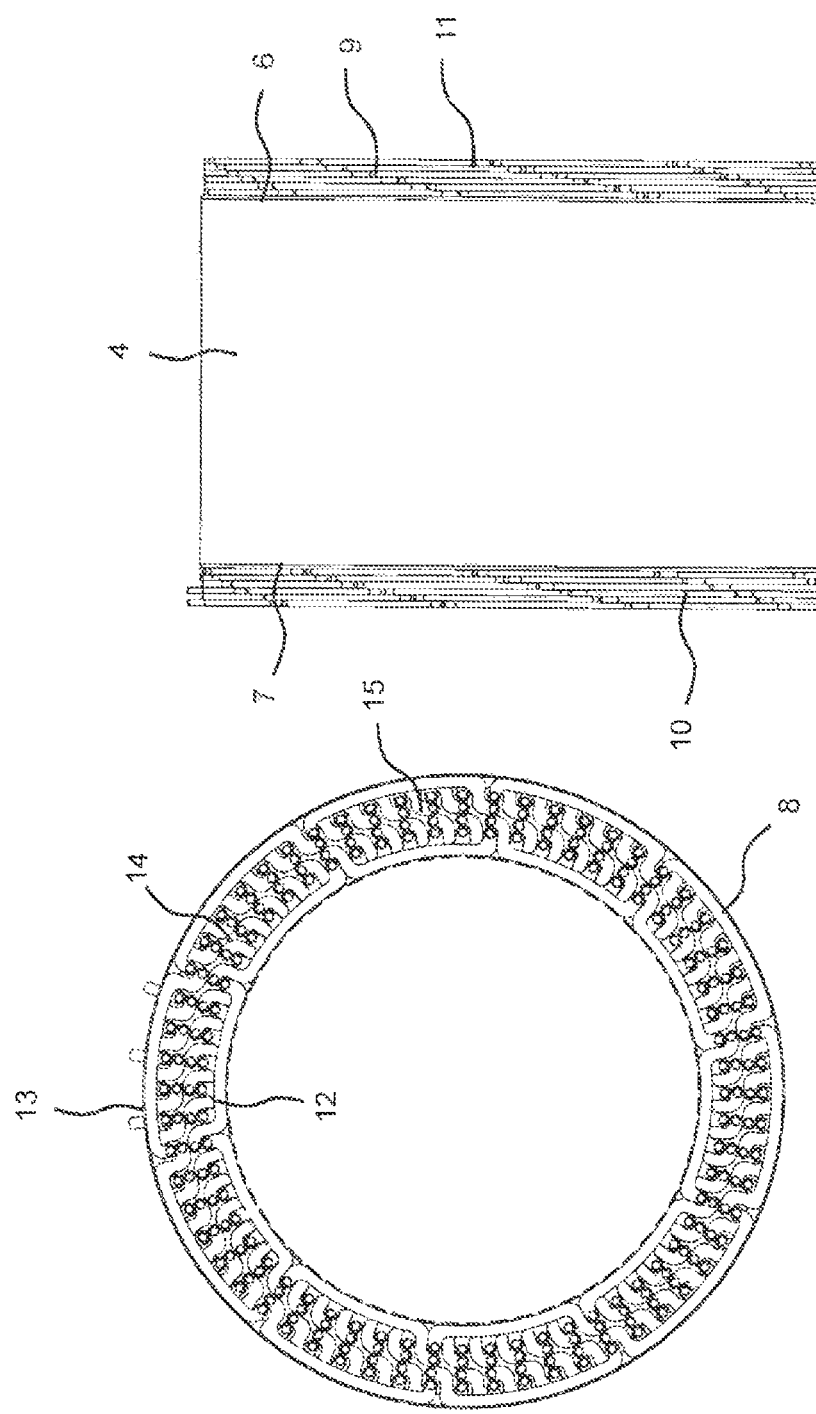
FIG. 2 shows a schematic perspective illustration of an arrangement for a plug-in coil of an electrical machine from the front and from the side.
Figure 3:
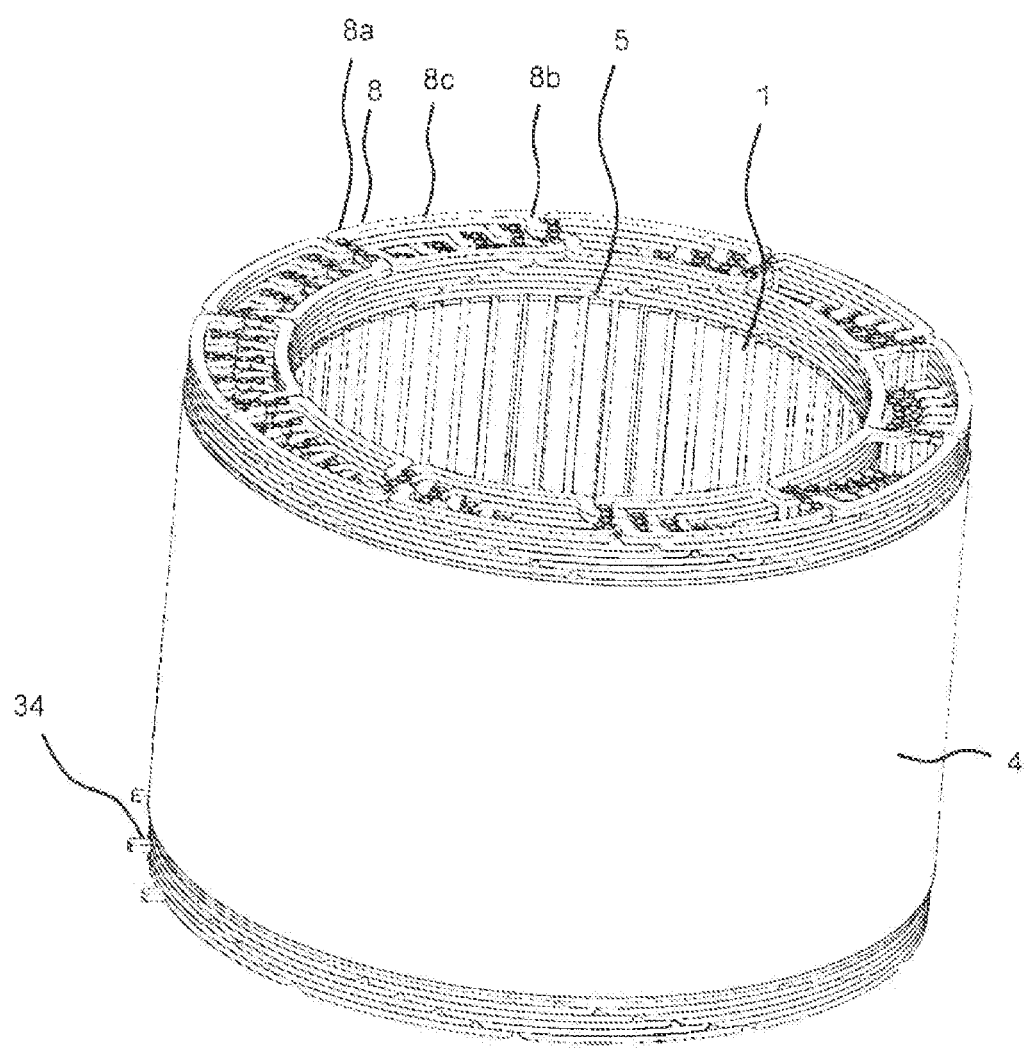
FIG. 3 shows a schematic perspective illustration of the arrangement according to FIG. 2.

FIG. 1 shows a schematic perspective illustration of an arrangement for a plug-in coil of an electrical machine having coil elements 1 which are rod-shaped and have a proximal end 2 and a distal end 3. A core 4, which is shown in the further arrangement in FIGS. 2 and 3, is omitted in the illustration in FIG. 1. The coil elements 1 are then arranged in grooves 5 of the core 4 after the coil elements 1 have been inserted into the grooves 5.

On an end face 6 and an opposite end face 7 of the core 4, connecting elements 8 are arranged in a stacked arrangement 9 in such a way that the connecting elements 8 each electrically connect proximal ends 2 of the coil elements 1 (on the end face 6) and distal ends 3 of the coil elements 1 (on the opposite end face 7). As a result, in the embodiment shown, a first segmented switching ring 10 is produced on the opposite end face 7 and a second segmented switching ring 11 is produced on the end face 6. In an alternative embodiment (not shown), the connecting elements 8 can also be provided only on the end face 6 or only on the opposite end face 7 for connecting the proximal end 2 or distal end 3.

In the embodiment shown by way of example, the connecting elements 8 are made of a flat wire material.

The connecting elements 8 each have a first joining portion 8a and a second joining portion 8b, which serve as joining partners for the distal end 3 or proximal end 2 of the coil elements 1. In the embodiment shown, at least one intermediate portion 8c of the connecting elements 8 is arranged in the region of a radially inner edge 12 or a radially outer edge 13 of a surface 14 which is covered by the core 4 on the end face 6 or on the opposite end face 7.

A free region 15 is formed between the stacked arrangements 9 of the connecting elements 8.

Figure 4:
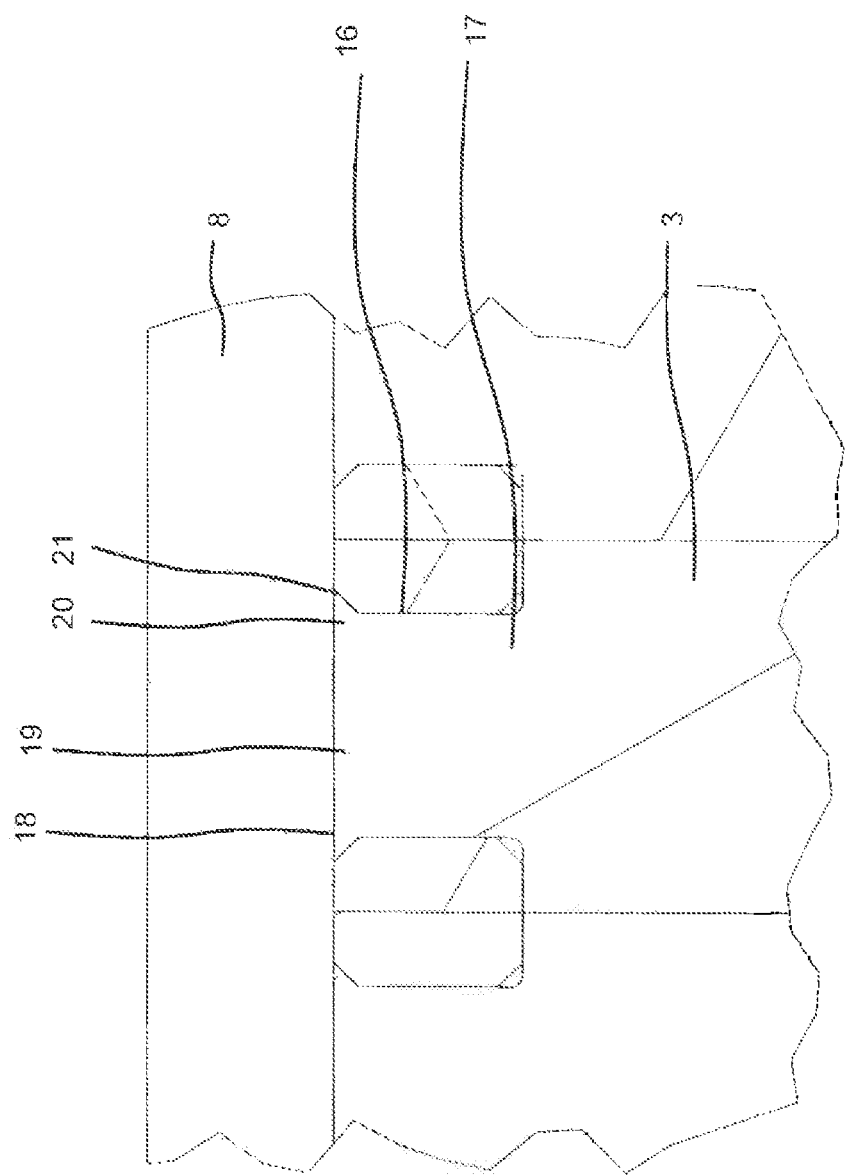
FIG. 4 shows a schematic illustration of a region of a connection between joining partners.
Figure 5:
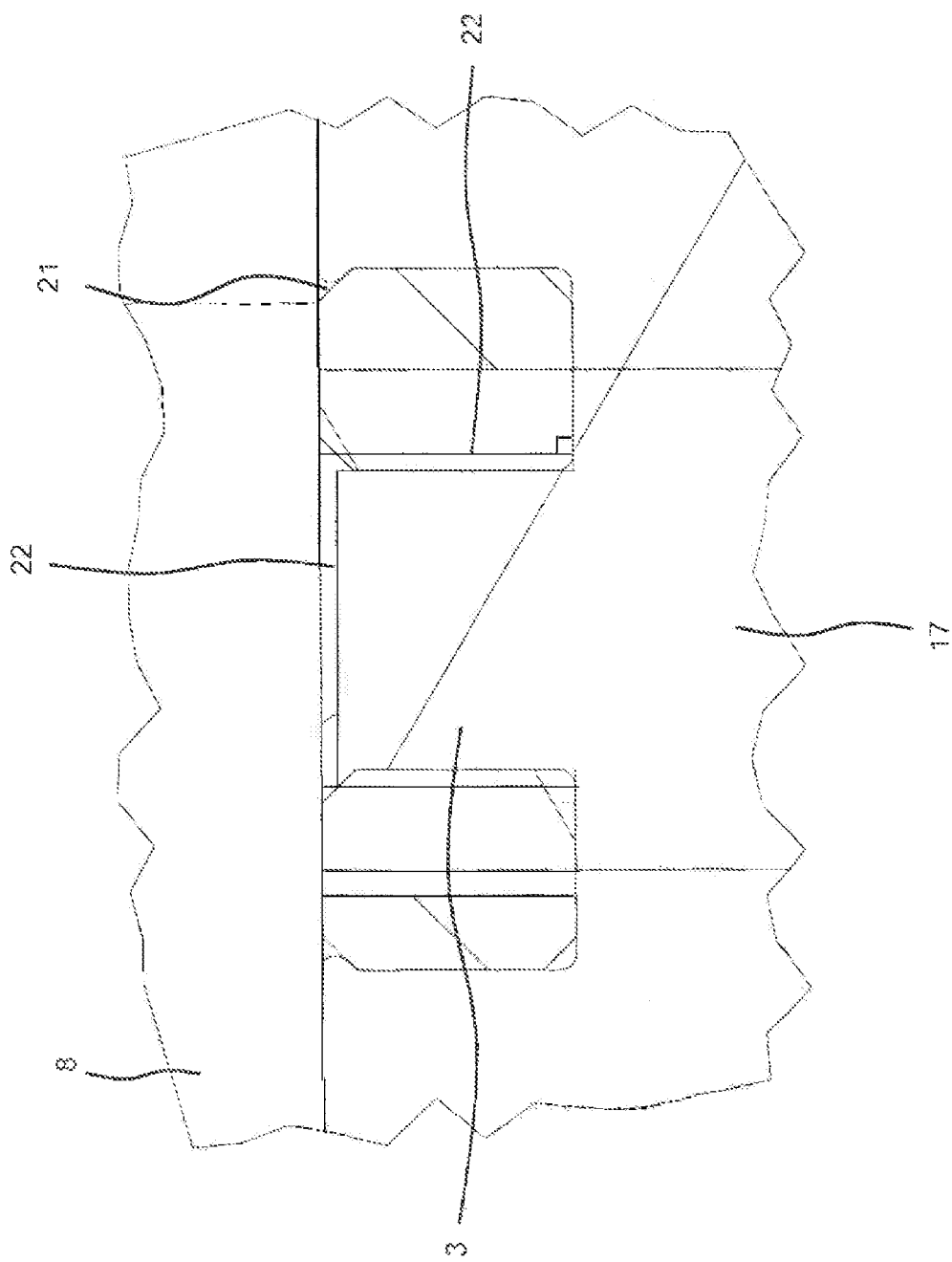
FIG. 5 shows a schematic illustration of the region of the connection according to FIG. 4, wherein electrical contact points are marked.

To produce electrical connections by means of the connecting elements 8, these elements are joined to the proximal end 2 or distal end 3, for example by means of welding and/or soldering. Before the joining process, a connection 16 is produced, for pre-positioning, between the first joining portion 8a and second joining portion 8b and the associated proximal end 2 or distal end 3 of the coil elements 1, for which FIGS. 4 and 5 show a possible embodiment. By means of the connection 16, the partners to be joined, specifically the first joining portion 8a or the second joining portion 8b and an in each case associated end of the coil elements 1, are fixed relative to one another before the joining process.

The connection 16 can be designed, for example, as a snap connection, plug-in connection and/or detent connection, it being possible, for example, to use the push-button principle (snap connection). Such an embodiment is shown in FIGS. 4 and 5. At the distal end 3 a projection 17 configured as a pin is formed, onto which the connecting element 8 is fitted.

The projection 17 is arranged in an associated recess 18 of the connecting element 8. A projection 20 formed on the projection 17 on a distal pin end 19 engages into a (circumferential) groove 21 on the connecting element 8.

In a comparable manner, connections to associated connecting elements can be produced alternatively or additionally in the region of the proximal ends 2.

FIG. 5 schematically shows electrical contact points or contact surfaces 22 between the joining partners, which points or surfaces result from the formation of the connection 16.

Figure 6:
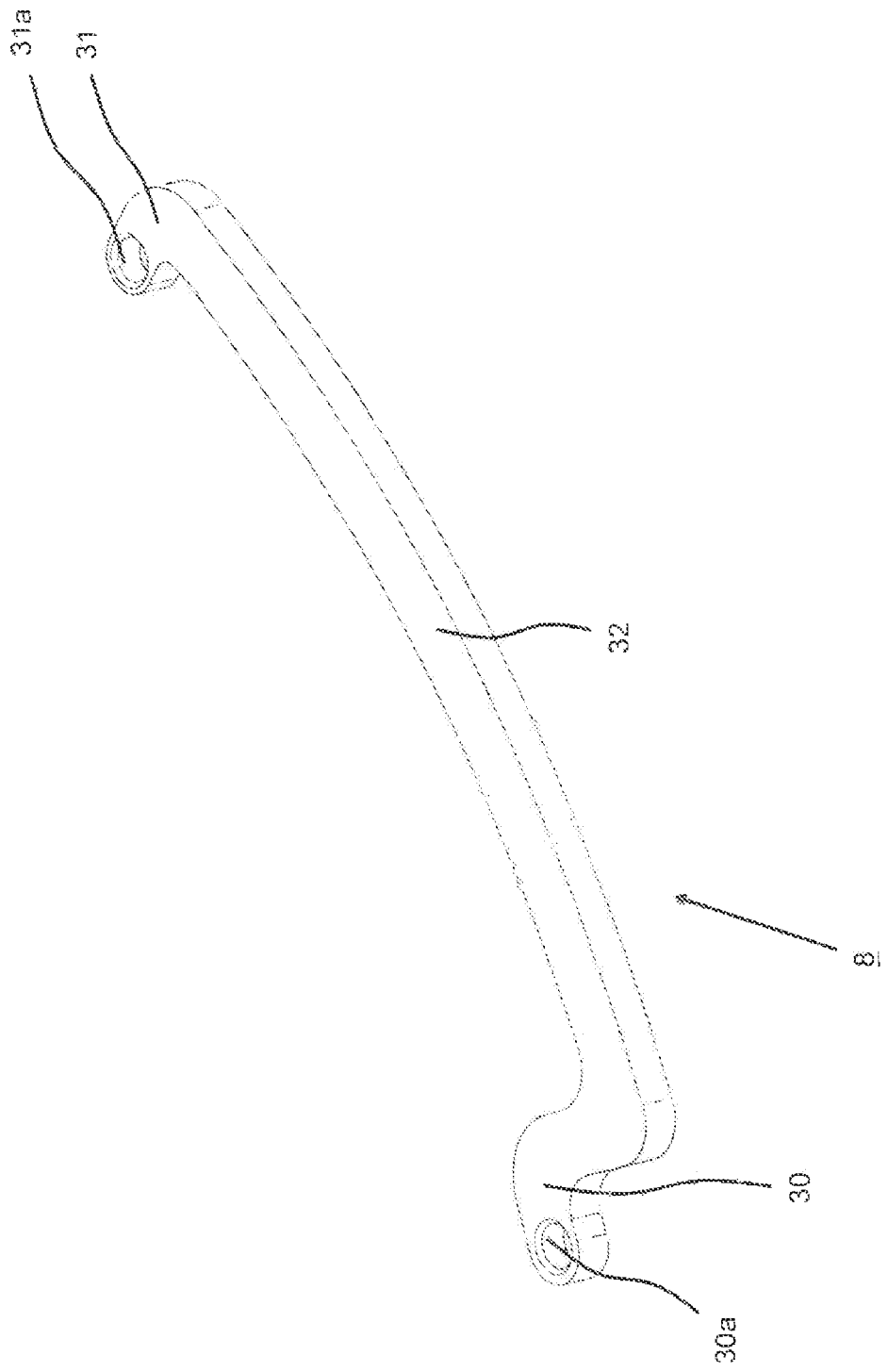
FIG. 6 shows a schematic perspective illustration of a connecting element.
Figure 7:
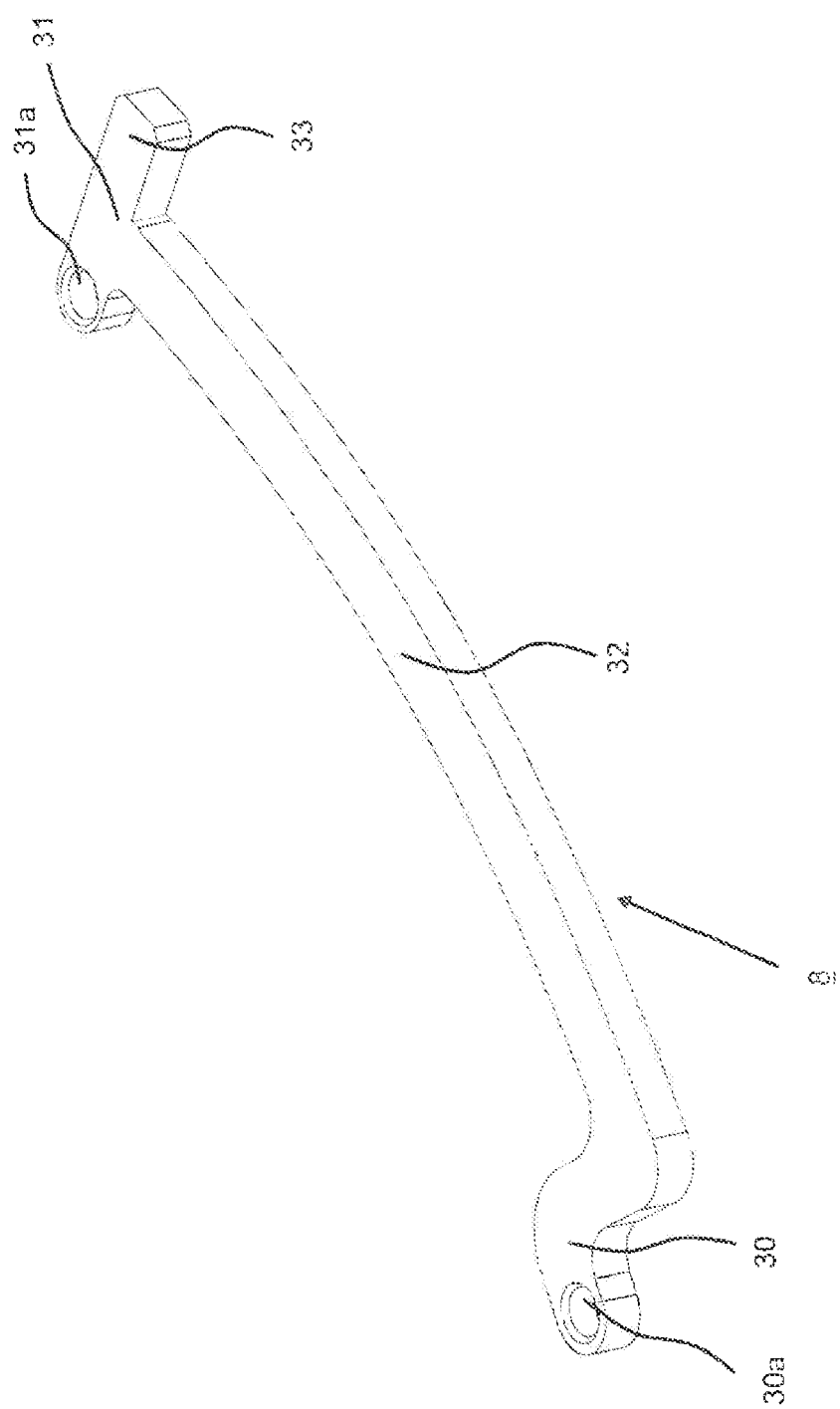
FIG. 7 shows a schematic perspective illustration of a further connecting element.

FIGS. 6 and 7 show schematic perspective illustrations of exemplary embodiments of the connecting element 8. These are configured in one piece and have openings 30a, 31a in end portions 30, 31 which accommodate the proximal end 2 or distal end 3, in order then to produce the particular joined connection. The opposite end portions 30, 31 are, at least in portions, transverse to a intermediate portion 32 which is configured as a (slightly) curved element portion.

The end portion 30 has an S shape. The openings 30a, 31a are arranged on the same side of the connecting element 8 with respect to the intermediate portion 32. In the embodiment in FIG. 7, the end portion 31 has an opposite extension 33. A terminal contact 34 can be formed by the extension 33, as shown in FIG. 3. In the embodiment shown, the one or more terminal contacts which are formed, for example, so as to have an in each case associated tab, are designed to protrude radially with respect to the end face/opposite end face of the core 4. A plurality of terminal contacts, which can be formed on different connecting elements, can be arranged so as to be offset to one another in the radial circumferential direction (cf. FIG. 3). External contacting of a coil formed so as to have the coil elements can take place by means of the terminal contacts.

In the embodiment shown, the connecting elements consist of a geometrically flat conductor material.

The features disclosed in the above description, the claims and the drawings can be relevant to implementing the different embodiments either individually or in any combination.

The invention claimed is:

1. A method for producing an arrangement for a plug-in coil of an electrical machine, the method comprising:
    providing a core with grooves;
    providing coil elements which are rod-shaped and have a proximal end and a distal end;
    inserting the coil elements into the grooves from one end face of the core with the distal end at the front, in such a way that the proximal end is arranged in the region of the end face and the distal end is arranged in the region of an opposite end face of the core or adjacent thereto, respectively; and
    producing a respective joined connection for the distal ends or the proximal ends of a first coil element and of a second coil element by means of an associated first connecting element on the opposite end face or the end face of the core, wherein a connection is formed in each case before the joining process between respective joining partners, such that the distal end or the proximal end of the first coil element and a first joining portion of the first connecting element and the distal end or the proximal end of the second coil element and a second joining portion of the first connecting element, by means of which connection the relative position of the joining partners in relation to one another is fixed and the connection is carried out as one of snap connection and detent connection;
    wherein during forming of the connection between the joining partners, a projection arranged on the distal end or proximal end of the coil element, which projection is configured as a pin and has a further projection formed on a distal end of the pin, is fitted onto the first connecting element so that the projection is arranged in an associated recess of the first connecting element and the further projection engages into a circumferential groove on the first connecting element.

2. The method according to claim 1, wherein, in a region of the connection, electrical contact points are formed between the joining partners on the end face and/or on the circumference.

3. The method according to claim 2, wherein, in a region of the electrical contact points, surface portions of the joining partners, which surface portions are provided with a conductor layer, are brought into contact.

4. The method according to claim 1, wherein a geometrically flat conductor material is used for the first connecting element.

5. The method according to claim 1, wherein at least one intermediate portion of the first connecting element, which is arranged between the first joining portion and the second joining portion, is arranged extending at least in portions along a radially inner edge and/or a radially outer edge of a surface covered by the core on the opposite end face or the end face.

6. The method according to claim 1, producing a respective joined connection for the distal end or proximal end of a third coil element and of a fourth coil element by means of an associated second connecting element on the opposite end face or the end face of the core, wherein a connection is formed in each case before the joining process between the respective joining partners, specifically the distal end or the proximal end of the third coil element and a first joining portion of the second connecting element, and the distal end or the proximal end of the fourth coil element and a second joining portion of the second connecting element, by means of which connection the relative position of the joining partners in relation to one another is fixed.

7. The method according to claim 1, wherein at least the first connecting element is produced as part of a first segmented switching ring on the opposite end face or the end face of the core.

8. The method according to claim 1, wherein, comparable to the joined connections for distal/proximal ends of coil elements on the opposite end face of the core, further joined connections for proximal/distal ends of coil elements are produced on the end face of the core.

9. The method according to claim 1, wherein the coil elements are provided as straight rod-shaped coil elements.

10. The method according to claim 1, wherein the coil elements are inserted into the grooves in sequentially successive insertion processes.

11. The method according to claim 1, wherein a plurality of connecting elements are arranged stacked on top of one another in layers on the opposite end face and/or the end face of the core.

12. The method according to claim 1, wherein a connecting element which has one or more terminal contacts is used as the first connecting element.

13. An arrangement for a plug-in coil of an electrical machine, comprising:
    a core which has grooves; and
    coil elements which are rod-shaped and have a proximal end and a distal end, wherein the coil elements are inserted into the grooves from one end face of the core, in such a way that the proximal end is arranged in the region of the end face and the distal end is arranged in the region of an opposite end face of the core or adjacent thereto, respectively;
    wherein, for pre-positioning before a joining process, a connection is formed in each case between respective joining partners, such that the distal end or the proximal end of a first coil element and a first joining portion of a first connecting element and the distal end or the proximal end of a second coil element and a second joining portion of the first connecting element, by means of which connection the relative position of the joining partners in relation to one another is fixed and said connection is carried out as one of snap connection and detent connection;
    wherein during forming of the connection between the joining partners, a projection arranged on the distal end or proximal end of the coil element, which projection is configured as a pin and has a further projection formed on a distal end of the pin, is fitted onto the first connecting element so that the projection is arranged in an associated recess of the first connecting element and the further projection engages into a circumferential groove on the first connecting element.

\* \* \* \* \*